United States Patent [19]

Driver et al.

[11] 4,084,149

[45] Apr. 11, 1978

[54] SONAR ACTUATED CONTROL DEVICE FOR POSITIONING MOVABLE OBJECTS

[75] Inventors: Don A. Driver; Franklin M. Theriault, both of Canton, Ohio

[73] Assignee: Diebold, Incorporated, Canton, Ohio

[21] Appl. No.: 774,978

[22] Filed: Mar. 7, 1977

Related U.S. Application Data

[63] Continuation-in-part of Ser. No. 594,314, Jul. 9, 1975, abandoned.

[51] Int. Cl.² ........................... G01S 9/66; E05F 15/20
[52] U.S. Cl. ..................................... 340/1 R; 49/25; 49/31; 109/19
[58] Field of Search ................. 340/1 R, 16 C; 49/25, 49/26, 28, 31; 109/19

[56] References Cited

U.S. PATENT DOCUMENTS 2,743,429  4/1956  Erdman et al. ...................... 340/1 R 3,098,992  7/1963  Rath .................................... 340/1 R

*Primary Examiner*—Richard A. Farley
*Attorney, Agent, or Firm*—Frease & Bishop

[57] ABSTRACT

A sonar device for controlling movement of an object such as a transport drawer for delivery of material or things under security conditions to a customer. Examples of such transport drawers are bank drive-up window deal drawers or similar deal-type drawers for secure delivery and sale of pharmaceuticals fast foods, library books and packages of valuable things. The sonar device detects when a predetermined fixed distance has been established or occurs between a moving object such as a banking equipment deal drawer, and an object or body such as a vehicle being served by or using the drawer; and signals that the fixed distance exists, which signal may trigger stopping of a motor drive for the drawer to avoid collision of the drawer with the vehicle.

13 Claims, 11 Drawing Figures

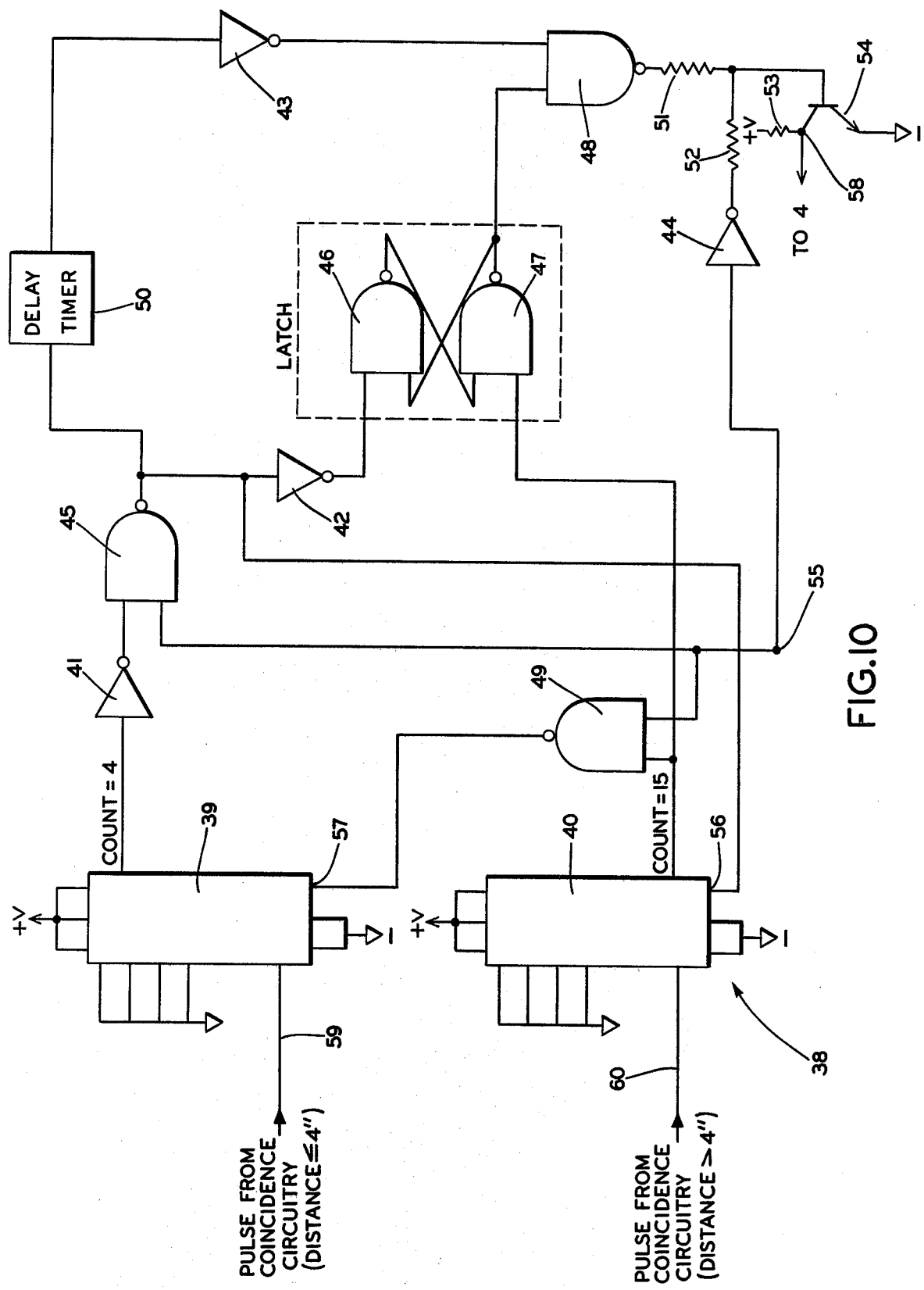

SONAR ACTUATED CONTROL DEVICE FOR POSITIONING MOVABLE OBJECTS

CROSS REFERENCE TO RELATED APPLICATION

This application is a Continuation-In-Part of our earlier application Ser. No. 594,314, filed July 9, 1975, allowed Dec. 16, 1976, and now abandoned.

BACKGROUND OF THE INVENTION

1. Field of the Invention

The invention relates to control of moving objects to avoid a collision with other objects or bodies; and more particularly to sonar detector devices mounted on a motor driven moving object to detect, measure or signal when a fixed predetermined distance has occurred as the moving object approaches said other object; and to use the signal as a control means for the motor drive to stop or reverse the motor and thus avoid moving object collision with or damage to said other object.

The operation of such sonar detector device may be used for a number of purposes. A primary use of the sonar device is to control the movement of a banking equipment deal drawer so that the power driven deal drawer, when moving toward a parked customer vehicle to a location accessible to a bank customer in the vehicle, will be stopped automatically by the sonar device before the drawer collides with the vehicle.

Next, the sonar device deal drawer control also may be used to detect the arrival of a bank customer vehicle at a banking unit station, and to signal such arrival to a bank teller; and at the same time to automatically start deal drawer movement toward the vehicle upon such arrival.

Next, the sonar device, in addition to stopping deal drawer movement when a fixed distance has occurred between a moving drawer and a vehicle, may energize the drawer drive to return the drawer to "home" position when the vehicle leaves the bank station.

Also, the sonar device may control drawer movement to maintain a fixed distance between a deal drawer and an object toward which the drawer has moved and then stopped upon reaching the fixed distance location, if the object subsequently moves. In such event, the drawer, controlled by the sonar device, moves as the object moves, while maintaining the fixed distance of separation between the drawer and object.

2. Description of the Prior Art

Drive-up or walk-up customer service banking devices equipped with deal drawers have been used in the banking field for many years. Some early teller-controlled banking service units of the described type do not prevent a deal drawer during extending movement from its housing from colliding with a person or vehicle using the service facilities, and do not prevent injury or damage to such person or vehicle as a result of the collision; except by the positive action of the bank service unit teller operating a control to stop the deal drawer motor to prevent collision. Examples of such banking service equipment are contained in U.S. Pat. Nos. 3,077,243, 3,152,662 and 3,429,082.

Other prior devices have been equipped with rubber bumpers on the heads of the deal drawers being projected, so as to minimize injury or damage to a person or vehicle struck by a power driven deal drawer, in the event that a teller fails to stop the motor drive for the deal drawer. Examples of such devices are U.S. Pat. Nos. 2,949,870, 3,059,840, 3,237,853 and 3,302,871.

Other prior power driven banking service units equipped with access door means have utilized a yielding door frame combined with safety switches which stop door movement when the door encounters an obstruction, as shown in U.S. Pat. No. 3,237,933.

Also, movable frame-switch type mechanism have been incorporated in rubber bumper-equipped deal drawers of unattended banking service stations, which frame-switch mechanisms stop drawer movement when the drawer encounters on obstruction, such as a vehicle, as shown in U.S. Pat. No. 3,828,698.

However, these prior constructions do not automatically prevent a moving power driven banking service equipment deal drawer from contacting or colliding with an object located in the line of and within the range of deal drawer movement. Further, these prior devices do not prevent the damage or injury that can occur when a power driven moving deal drawer collides with a vehicle or other object.

Thus, a need exists in the field of banking service equipment utilizing power driven deal drawers for control means to prevent the deal drawers from colliding with a vehicle, or other object in the line of and within the range of deal drawer movement.

Similar needs exist in other fields for such control means for the protective delivery or sale, including collecting payment for the sale, of such things, for example, as drugs, fast foods, library books, etc., using a protective deal-type transport drawer.

SUMMARY OF THE INVENTION

Objectives of the invention include providing a control device which automatically prevents a power driven deal drawer from striking or colliding with an object being served by the deal drawer and which is moving toward the object; providing a new control device for a power driven moving body which measures and signals when a predetermined distance exists between the moving body equipped with the control device and an object with which the body will collide unless movement of the body is stopped, and which signal either stops or reverses movement of the body or maintains a fixed predetermined space between the moving body and object; providing a sonar actuated control device for accomplishing the stated objectives and for controlling the positioning of a power driven moving object; and providing new banking service deal drawer movement control systems, equipment and operations which achieve the stated objectives in a safe, effective, efficient and inexpensive manner, and which solve problems and satisfy needs existing in the banking field.

These and other objects and advantages may be obtained by the new power driven moving object positioning and control system, the general nature of which may be stated as including, for example, in banking service equipment of the type of which movable deal drawer means having a head and a motor drive for the deal drawer is mounted in housing means movable between closed and open positions; the combination of sonar detector means mounted on the deal drawer means head; said detector means including ultrasonic transducer wave transmitter and receiver means on the head tuned to the same frequency; means operative during drawer head movement toward open position for energizing the transmitter means to emit ultrasonic pulses having a predetermined repetition rate from the transmitter means toward an object to be serviced by the deal drawer means at an open position of the deal drawer means; pulses reflected from said object being received by said receiver means; means for detecting the propagation time of a transmitted and a corresponding received pulse; said detected propagation time at any drawer head location indicating the distance between the head and said object at said drawer head location; said detector means also including means for generating a reference propagation time signal synchronized to the transmitted pulses; said reference propagation time representing a predetermined fixed stopping distance between the drawer head and object; means for comparing the detected propagation time with the reference propagation time; and means for stopping the deal drawer motor drive operative when the detected propagation time corresponds to said reference propagation time.

BRIEF DESCRIPTION OF THE DRAWINGS

Preferred embodiments of the invention — illustrative of the best mode in which applicants have contemplated applying the principles — are set forth in the following description and shown in the drawings and are particularly and distinctly pointed out and set forth in the appended claims.

FIG. 10 is a circuitry diagram of a Digital Filter and Accumulator component combination.

Similar numerals refer to similar parts throughout the various figures of the drawings.

DESCRIPTION OF THE PREFERRED EMBODIMENTS

First Embodiment

Figure 1:
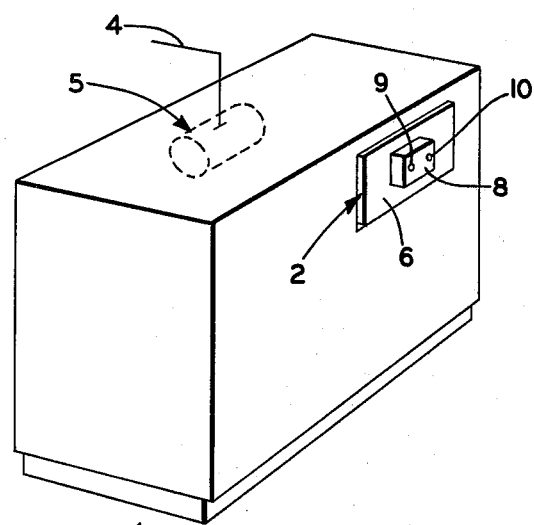
FIG. 1 is a diagrammatic perspective view representing a typical drive-up banking service unit equipped with a deal drawer.
Figure 2:
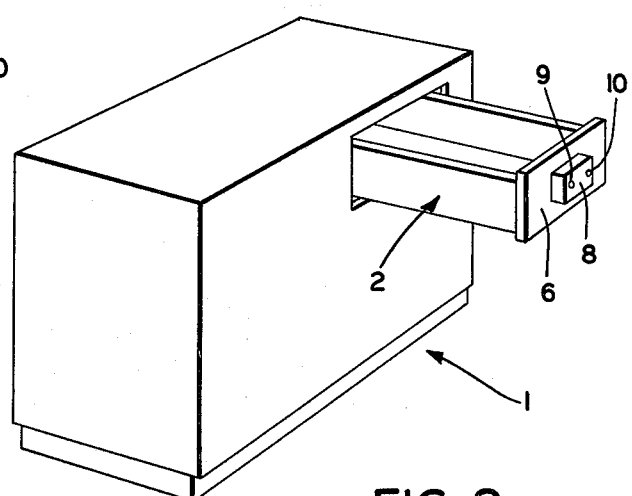
FIG. 2 is a view similar to FIG. 1 showing the deal drawer projecting to an open position.

A banking service unit generally indicated at 1 is equipped with a deal drawer generally indicated at 2 which may be motor driven for movement between the closed position of FIG. 1 and the open position of FIG. 2. The unit 1, represented diagrammatically, may be any one of a number of types of drive-up banking stations, or vehicle teller stations, whether attended or unattended. The banking service stations of the various types noted all are characterized by having deal drawers such as indicated at 2 that move to a position to serve a bank customer in a vehicle at a location adjacent the open position of the deal drawer 2.

A bank customer riding in a vehicle, indicated generally at 3, has just arrived at a location adjacent the banking unit 1 (FIG. 3) to carry out a banking operation.

Prior banking units of the general type described and such as shown in the patents referred to above, normally have had rubber bumper means mounted on the deal drawer head so as to minimize damage in event that the power driven drawer 2 strikes a vehicle 3.

Usually, the drawer 2 forms part of a teller-attended station; and in such prior devices, the teller controls the distance that the deal drawer 2 is projected to a position accessible to the bank customer. However, for a variety of reasons, sometimes the teller may fail to properly control movement of the deal drawer 2, and the deal drawer may collide with the vehicle 3.

Furthermore, the deal drawer 2 may be part of a teller unattended station, and prior constructions may involve the likelihood that the deal drawer may strike the vehicle 3 if the vehicle 3 has been driven too close to the unit 1.

In accordance with the invention, the possibility of contact of collision between the deal drawer 2 and vehicle 3 is avoided by providing means for controlling the distance, relative to the vehicle, that a moving power driven deal drawer head is moved toward the vehicle so that a space always is maintained between the vehicle and the moving deal drawer head, constituting a predetermined fixed distance.

The control of the distance that the deal drawer 2 moves so as to provide for the desired predetermined fixed distance or space beyond which a moving deal drawer is not moved in approaching a vehicle is accomplished by the coaction of the sonar detector means or system or control combined with the motor drive of the deal drawer.

Figure 5:
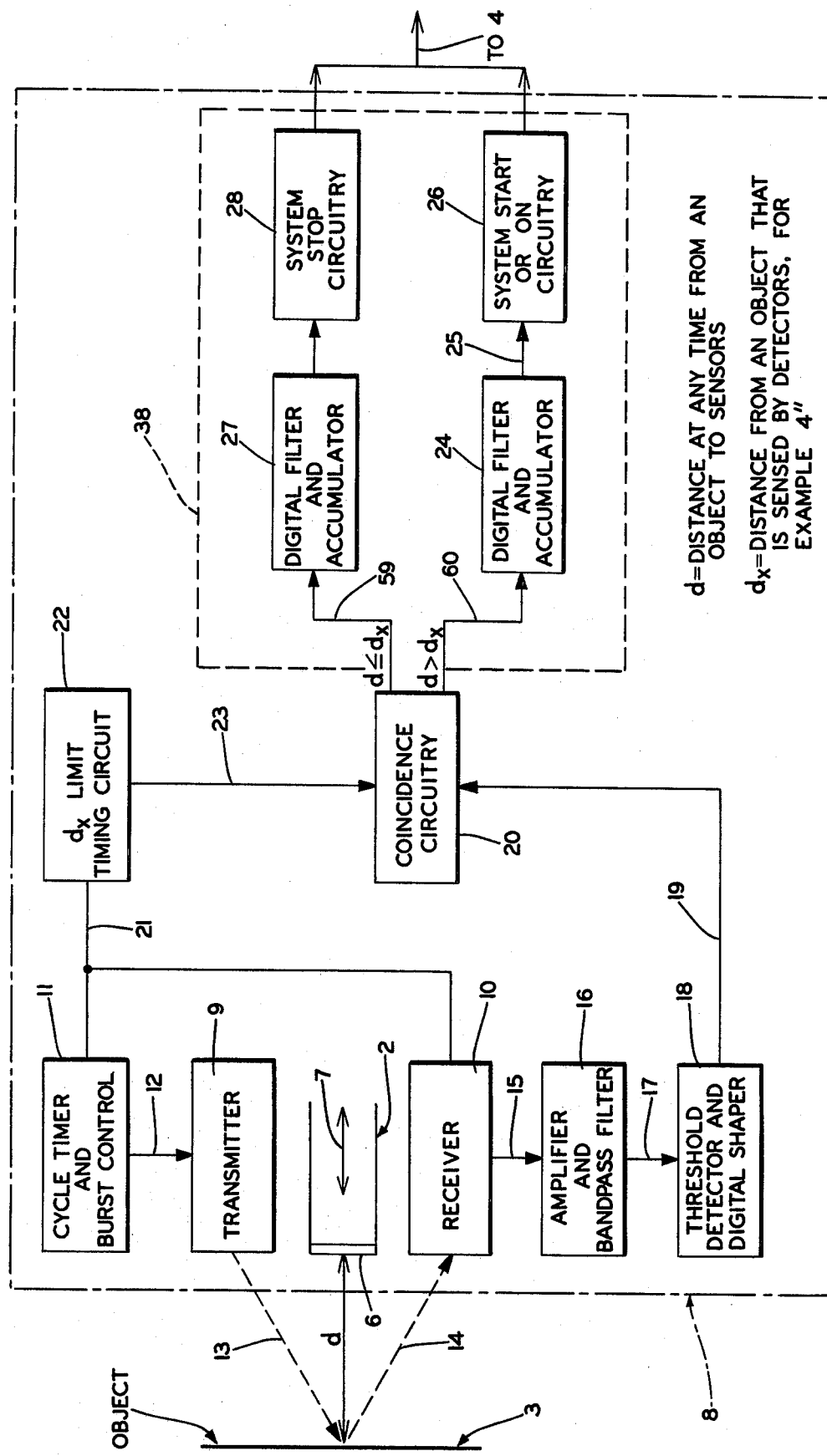
FIG. 5 is a block diagram of the sonar detector system.

This sonar detector system is illustrated in the block diagram of FIG. 5. The final signal or signals given by the system are applied to the motor drive means circuitry indicated diagrammatically by the conductor means 4 shown in FIG. 1, which controls the operation of the drive motor 5 for the deal drawer 2 as to starting, stopping and reversing the motor 5.

The sonar detector system includes various components illustrated in FIG. 5. The object, such as a vehicle 3, is positionally indicated by the line 3 in FIG. 5. The drawer head 6 of the deal drawer 2 can move when driven by the motor 5 in either direction as represented by the double-headed arrow 7. Components of the sonar detector system and its circuitry are carried by the drawer 2 and drawer head 6, and are represented diagrammatically by the rectangle 8 in FIGS. 1 to 4 and by the rectangle 8 in FIG. 5. The detector system 8 has a transmitter 9 and a receiver 10 mounted on the drawer head 6.

The initial component of the system 8 is the Cycle Timer and Burst Control 11. The system 8 and therefore the timer 11 may be energized by a switch or a control signal actuated by a teller. If the unit 1 is located in an unattended banking service station, the system 8 is continuously energized. The timer circuitry includes an oscillator circuit that outputs a voltage pulse of twenty microseconds duration every ten milli-seconds. These pulses through circuitry 12 are applied to the transmitter 9.

The transmitter 9 comprises an ultrasonic transducer or sound source that emits a sound wave of selected frequency in the ultrasonic band from 20 kilohertz to 50 kilohertz. The transducer of transmitter 9 may be a piezoelectric element or crystal which when subjected to a voltage stress, emits a sound wave. Such piezoelectric element may have a natural frequency $(f_n)$ of 23 KHZ per second.

A receiver 10 likewise may comprise a similar ultrasonic transducer piezoelectric element of the same type and with the same $f_n$. The element in receiver 10 is stressed by incoming sound waves, which generates an electric signal.

When a pulse from timer 11 is applied to the transmitter transducer 9, the transducer is excited and when excited, it emits ultrasonic waves at its natural frequency, indicated by the dotted line 13, which strike the object 3 when the object is in the path toward which the deal drawer head 6 is traveling in the direction of the left-hand head of arrow 7.

The emitted sound waves on striking the object 3 are reflected toward receiver 10. The reflected waves are indicated by the dotted line 14. These reflected waves 14 excite the receiver transducer 10 which when activated or excited, starts resonating at the natural resonant frequency of the crystal. This generates a voltage, and the voltage signal is transmitted through circuitry 15 to an Amplifier and Bandpass Filter 16 where the signal is selectively amplified.

The amplified signal from amplifier 16 is fed through circuitry 17 to a Threshold Detector and Digital Shaper 18 which converts the signal from an AC burst to a DC pulse signal. The component 18, acting as a converter, also includes threshold detector means which rejects extraneous noise and only retains the wanted signals from transmitter 9 and receiver 10, which constitute signals of a detected propagation time.

The pulse signal from converter 18 is applied through circuitry 19 to the Coincidence Circuitry 20 where it is compared with a reference signal of a fixed time duration as described below. The coincidence circuitry 20 is composed of a number of RCA CD 4011A Quad 2-input NAND gates configured to provide coincidence circuitry.

The voltage pulse output of timer 11 also is applied through circuitry 21 to the Distance Limit Timing Circuit 22. These pulses initiate a timer in the circuit 22 whose time period is equivalent to or a function of the fixed distance dx representing the space to be maintained or not to be encroached upon by movement of the deal drawer 2 toward the object 3.

This fixed time period is the period of time that elapses for sound to travel through the space to be maintained (such as 4 inches). This time period is sometimes referred to herein as the reference propagation time. The signal of the fixed time period from circuit 22 is applied through circuitry 23 to the Coincidence Circuitry 20 and compared with the signal received (detected propagation time) from the converter 18.

The results of the comparison between the reference propagation time and the detected propagation time are fed to a Digital Filter and Accumulator, indicated at 24 and which is further described below. If the distance $d$ between the head 6 and object 3, represented by the detected propagation time, sensed by the comparison is greater than the distance $dx$, the signals are fed to filter accumulator 24. The signals are accumulated in component 24, and a resultant signal is applied through circuitry 26 to a System Start or "on" Circuit 26. The start signals from circuitry 26 are transmitted to the motor control circuitry 4 of the drive motor 5 for the deal drawer 2 to start the motor or continue driving the motor under these conditions.

When coincidence occurs in circuitry 20 between the signals from circuit 22 and the converter 18 indicating that the detected signals of the distance $dx$ (4 inches distance) that has been sensed and the signals representing the distance $d$ are the same, (that is, if the distance $d$ is equal to the distance $dx$), then the information from circuitry 20 is fed to the Digital Filter and Accumulator 27 which in turn signals the Stop Circuitry 28 to generate a signal to the deal drawer drive motor 5 circuitry to stop the motor.

This same series of signals through filter 27 and stop circuitry 28 are transmitted to the drive motor in the event that the distance $d$ sensed and represented by signals from the converter 18, is less than the fixed 4 inches distance $dx$ to be maintained.

Figure 3:
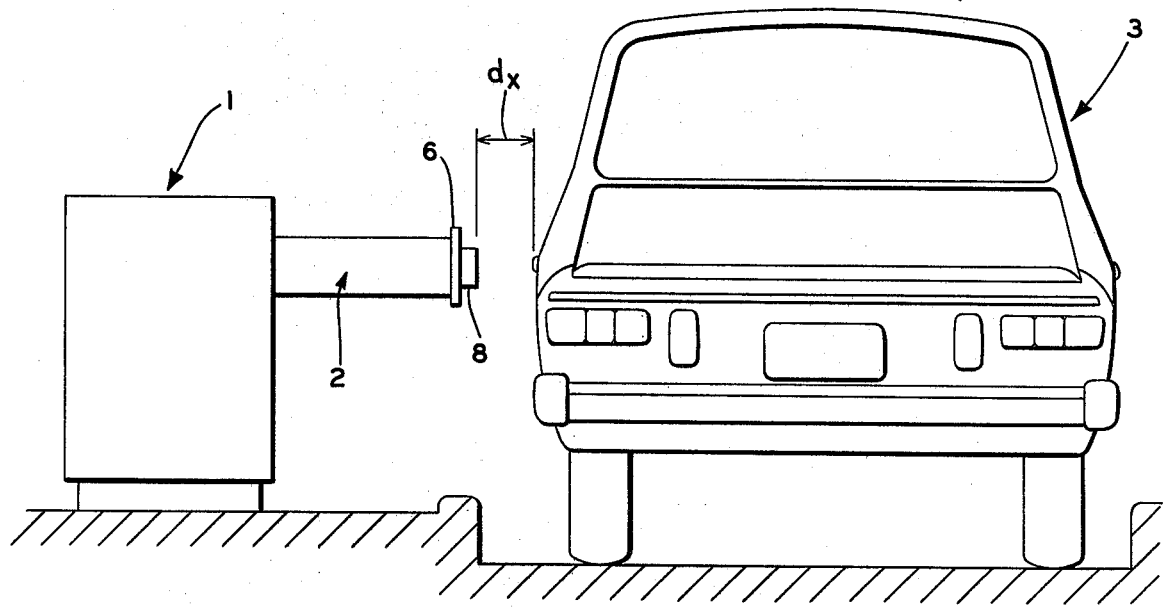
FIG. 3 is a diagrammatic side view of a unit such as shown in FIG. 2 with the deal drawer open adjacent a driveway and a vehicle being served by the deal drawer adjacent thereto.
Figure 4:
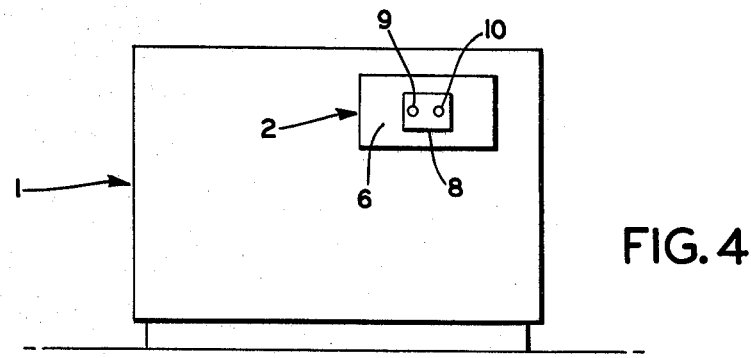
FIG. 4 is a diagrammatic front view of the unit shown in FIG. 1 to illustrate the position of some of the ultrasonic sensor components of the sonar detector system.

To summarize, in the operation of the sonar detector system 8, illustrated in FIG. 5, whenever the system 8 is energized, and when a teller actuates a switch to start the deal drawer drive motor 5 to move the deal drawer from the "home" position of FIG. 1 toward the extended or open position of FIGS. 2 and 3, the system 8 assumes control of deal drawer movement, and the "start" signals from circuitry 26 command that the deal drawer motor drive shall continue driving. Thus, the deal drawer movement continues until circuitry 28 signals the deal drawer motor drive to stop further movement, because the deal drawer head 6 has arrived at the control location of the fixed 4 inch distance $dx$. The customer then transacts the desired banking business. When completed, the customer drives away and then a switch may be actuated by a teller or other means to energize the deal drawer motor drive 5 to retract the deal drawer from extended to "home" position. When the deal drawer arrives "home", the system gives up control of the deal drawer drive motor.

Second Embodiment

The fundamental concept of the new sonar detector system 8 (FIG. 5) control of deal drawer movement may be modified or supplemented to provide additional controls. Thus, following arrival and stopping of a sonar system-controlled deal drawer 2 at a fixed distance location (such as 4 inch) with respect to a vehicle or object 3; if the object subsequently moves, the system control may command the drawer to move as the object moves while the fixed distance (4 inch) of separation between the drawer and object is maintained.

Figure 6:
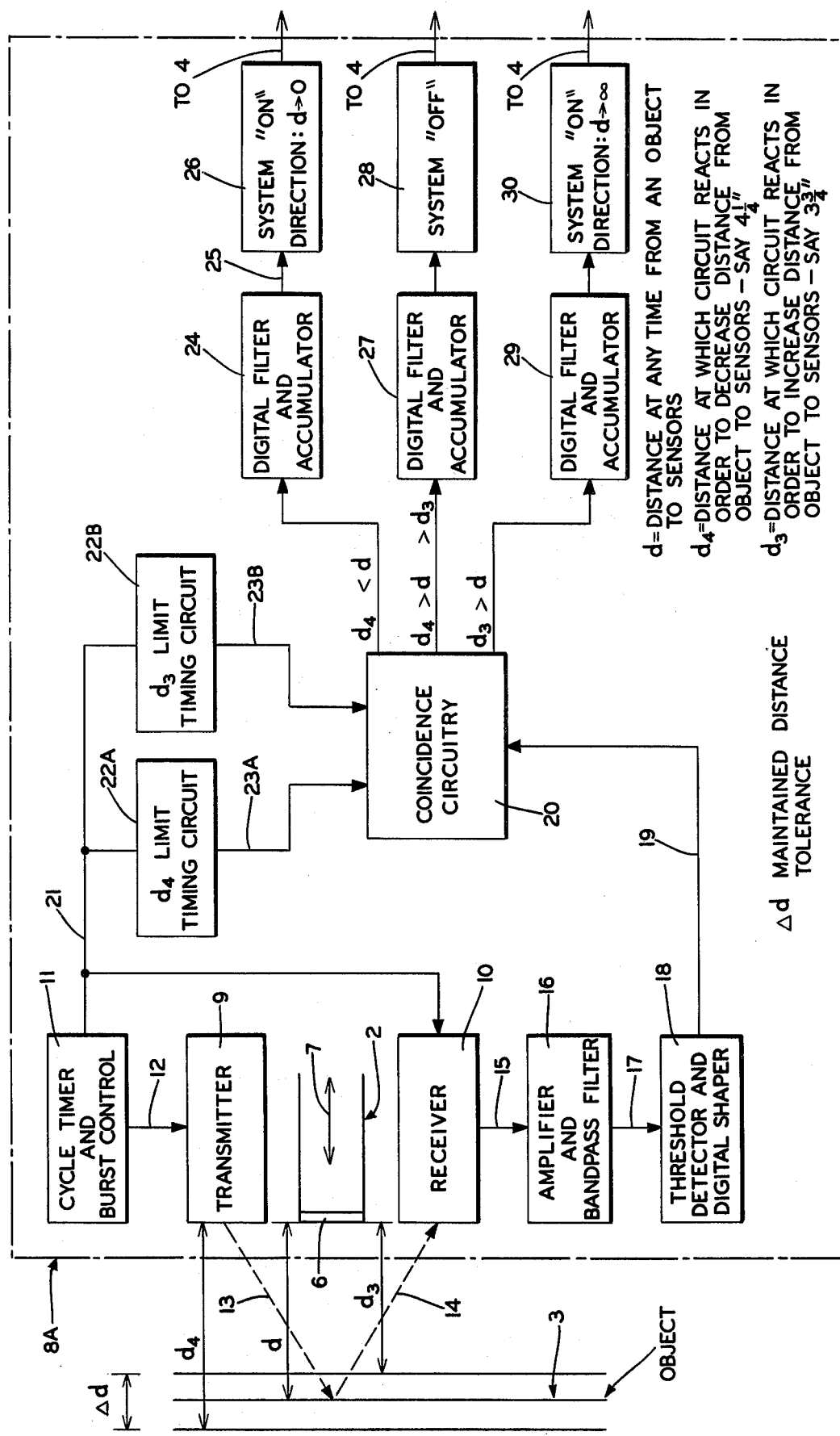
FIG. 6 is a block diagram of the sonar detector system of FIG. 5 modified to maintain a fixed predetermined distance between a movable deal drawer and an object in event that the object moves.

This system modification is shown in the block diagram 8A of FIG. 6. The system 8A of FIG. 6 includes the same components as in FIG. 5 which operate in the same manner, except that two Distance Limit Timing Circuits 22A and 22B are provided, as well as a third Digital Filter and Accumulator 29.

Assume that the fixed distance $dx$ to be maintained is 4 inches and that the tolerance for stopping deal drawer movement, the Maintained Distance Tolerance, is represented by Delta $d$, which defines the space between $d_3$ and $d_4$ where:

$d_3$ (for example, 3¾ inches) — is the distance at which the detector circuitry reacts in order to increase the distance from the object 3 to the transmitter 9 and receiver 10;

$d_4$ (for example, 4¼ inches) — is the distance at which the detector circuitry reacts in order to decrease the distance from the object 3 to the transmitter 9 and receiver 10; and $d$ (as in FIG. 5) — represents the distance between the head 6 and the object 3 at any time.

The timer period of circuit 22A is equivalent to the $d_4$ distance (4¼ inches); and the timer period of circuit 22B is equivalent to the $d_3$ distance (3¾ inches). The signals of the fixed time periods from circuits 22A and 22B are applied through circuitry 23A and 23B, respectively, to the Coincidence Circuitry 20, and there are compared with signals received from the converter 18, from which the results of the comparison are fed to the Filter Accumulators 24, 27 and 29.

If the object 3 moves away from, that is with respect to the controlled drawer head 6, so that the distance $d$ (which also is $dx$ when the deal drawer is stopped at the fixed 4 inch value) becomes greater than $d_4$ (4¼ inches), signals are fed to accumulator 24 from which a resultant signal is applied to the system "on" circuitry 26, which starts the deal drive motor to move in a direction to decrease the distance between the drawer head 6 and the object 3, that is toward the object 3, to maintain the fixed 4 inch distance $dx$.

Conversely, if the object 3 moves toward the stopped drawer head 6, so that the distance $d$ becomes less than the distance $d_3$ (3¾ inches), the signals from the circuitry 20 are fed to accumulator 29, and a resultant signal is applied to system "on" circuitry 30, whose signals command the motor control circuitry 4 to drive the deal drawer drive motor 5 in a direction to increase the distance between the drawer head 6 and the object 3, that is away from the object 3, to maintain the fixed 4 inch distance $dx$.

When the distance $d$ lies between $d_3$ and $d_4$ as a result of operation from commands from either system "on" components 26 or 30, the coincidence circuitry 20 signals are transmitted to filter accumulator 27 which in turn signals circuitry 28 to generate a "stop" signal to the deal drawer drive motor 5 circuitry to stop the motor and thus stop the deal drawer at the controlled predetermined fixed 4 inch distance $dx$.

The system 8A of FIG. 6 may be combined with the system 8 of FIG. 5 so as to not only control stopping or positioning of the deal drawer 2 at the predetermined fixed distance desired, say 4 inches, as described, but to maintain this 4 inch distance in the event that the object moves in either direction with respect to the extended deal drawer.

Third Embodiment

The fundamental concept of the new sonar detector system 8 (FIG. 5), or as supplemented by the additional control of the system 8A (FIG. 6), may be modified or supplemented further to provide additional controls where desired. Thus, the sonar system-controlled deal drawer 2, controlled by either of the systems 8 or 8A, may have such systems energized upon arrival of a vehicle at the unit 1 when the deal drawer is closed, as in FIG. 1.

Figure 7:
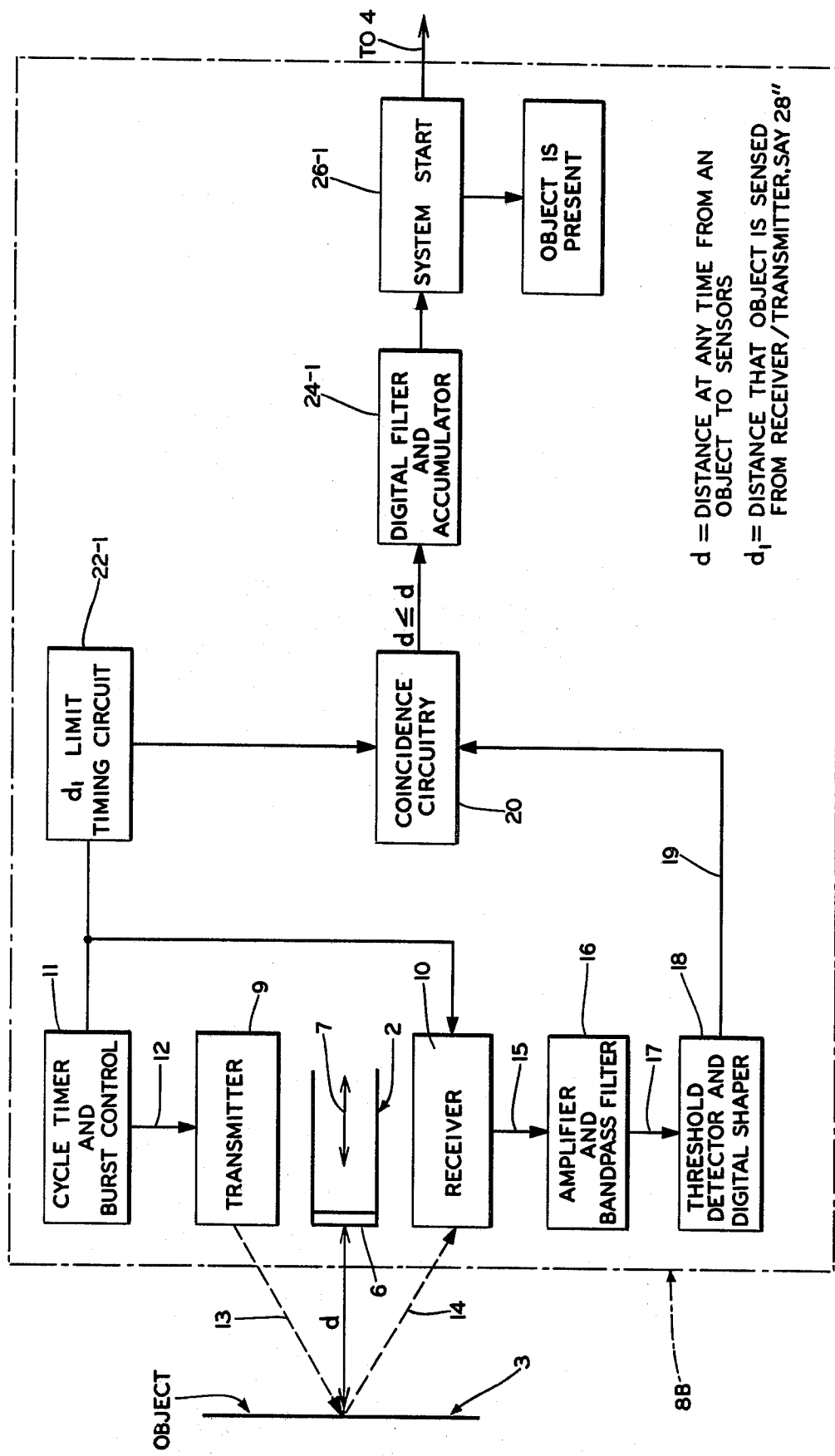
FIG. 7 is a block diagram of additional circuitry which may be added to the systems shown in either of FIGS. 5 and 6 to energize those systems upon arrival of a vehicle at a deal drawer station.

This system modification is shown in the block diagram 8B of FIG. 7. The system 8B of FIG. 7 includes some of the same components as in FIG. 5 which operate in the same manner except that another Distance Limit Timing Circuit 22-1 is provided as well as another Digital Filter and Accumulator 24-1.

The timing circuit 22-1 has a time period equivalent to or a function of a distance $d_1$, for example 28 inches, which is a distance greater than the normal distance at which a vehicle 3 is located when it arrives at a unit 1.

The system 8B is maintained energized at all times when the banking station is open, so that upon arrival of a vehicle 3 at the unit 1, the distance $d$, which is the actual distance of a vehicle from the deal drawer 2 on arrival, and which distance is sensed by the system 8B and is less than 28 inches, results in a comparison of signals received by the coincidence circuitry 20 from converter 18, and from the $d_1$ Limit Timing Circuit 22-1. The results of the comparison are fed to the Filter Accumulator 24-1 when the distance $d$, as indicated, is less than or equal to the distance $d_1$.

A resultant signal is applied from component 24-1 to a System "start" Circuitry 26-1 which signals the arrival of the vehicle and transmits a signal to the motor drive circuitry 4 to energize the drive motor 5, and at the same time to energize the system 8 of FIG. 5 to control movement of the deal drawer 2 as it moves toward the arrived vehicle 3.

In this manner, the improved sonar detector system of the invention with circuitry as indicated in FIGS. 5, 6 and 7 may not only control movement of the deal drawer but may upon arrival of a vehicle at the unit 1 energize deal drawer movement and control.

Fourth Embodiment

The fundamental concepts of the invention including the controls that may be exercised by the systems 8, 8A and 8B of FIGS. 5, 6 and 7 may be further modified or supplemented to provide an additional control. Thus, when a customer in a vehicle 3 at a unit 1 has completed a banking transaction and drives a vehicle 3 away from the banking station, the sonar system-controlled deal drawer 2 in the extended position may be moved from extended to "home" position upon the vehicle's departure.

Figure 8:
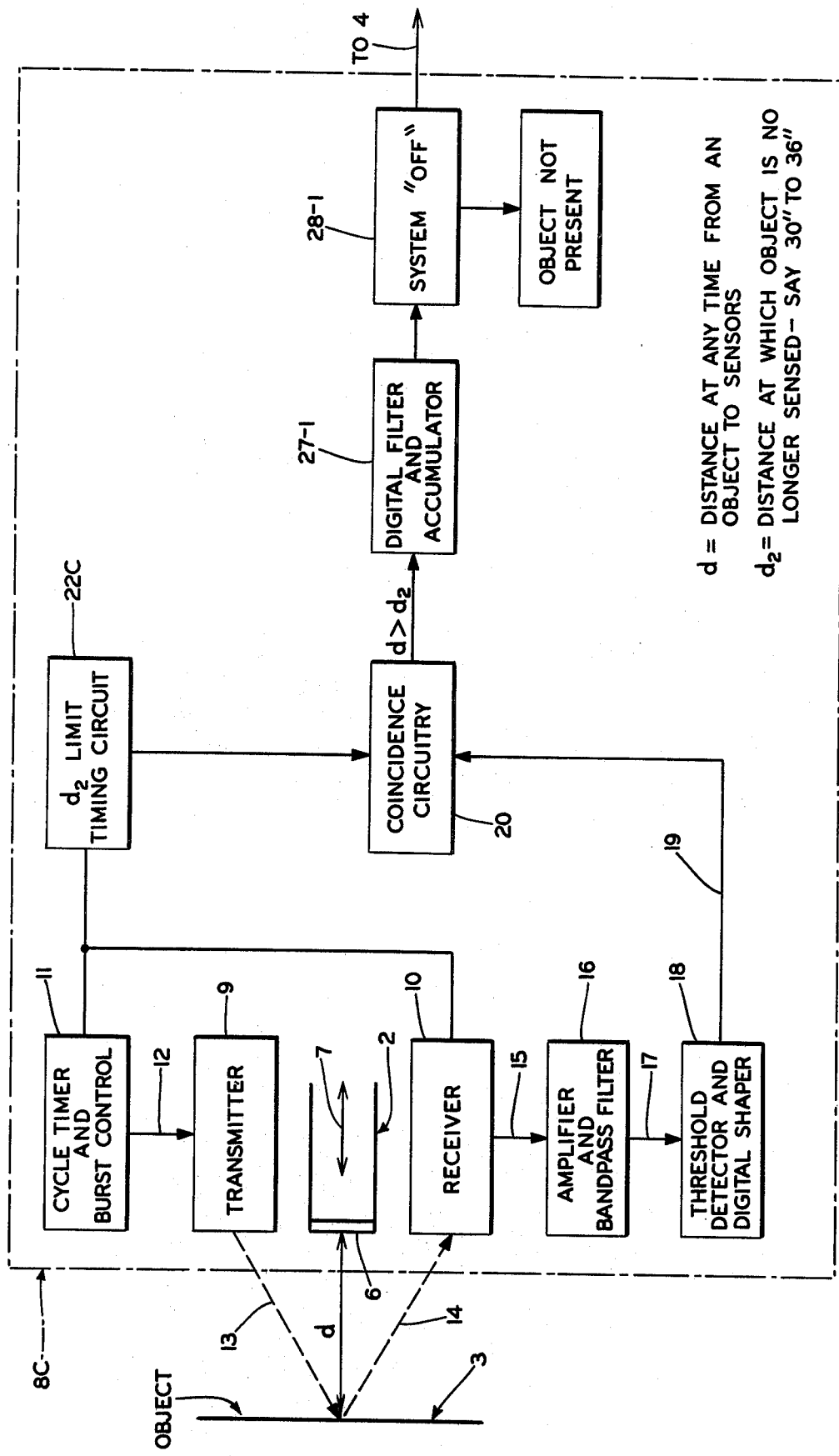
FIG. 8 is a block diagram of additional circuitry which may be added to the systems of FIGS. 5, 6 and 7 to return the deal drawer to "home" position when a vehicle leaves a deal drawer station.

This system modification is shown in the block diagram 8C of FIG. 8. The system 8C of FIG. 8 includes some of the same components as in FIGS. 5, 6 and 7 which operate in the same manner, except that another Distance Limit Timing Circuit 22C is provided, as well as another Digital Filter and Accumulator 27-1.

The fixed time period of timing circuit 22C may be equivalent to a fixed distance of say 30 inches to 36 inches, represented as $d_2$ in FIG. 8. This represents a distance at which the vehicle 3 is no longer sensed because the vehicle has left the station. The distance $d$, as in other figures, is the actual distance of a vehicle, sensed by the system, from the deal drawer head 6.

The system 8C is energized at all times or at least when a vehicle is located at a unit 1. When the sensed distance $d$ becomes greater than the distance $d_2$, upon vehicle departure, the comparison of signals received from the converter 18 and the $d_2$ circuit 22C results in producing signals which are fed to the accumulator 27-1, thus signaling that the vehicle has departed.

A resultant signal is applied from component 27-1 to a system "off" component 28-1. The system "off" circuitry 28-1 then transmits signals to the motor control circuitry 4 of the drive motor to start the drive motor and retract the deal drawer 2 from extended to "home" position.

Timing Diagram

Figure 9:
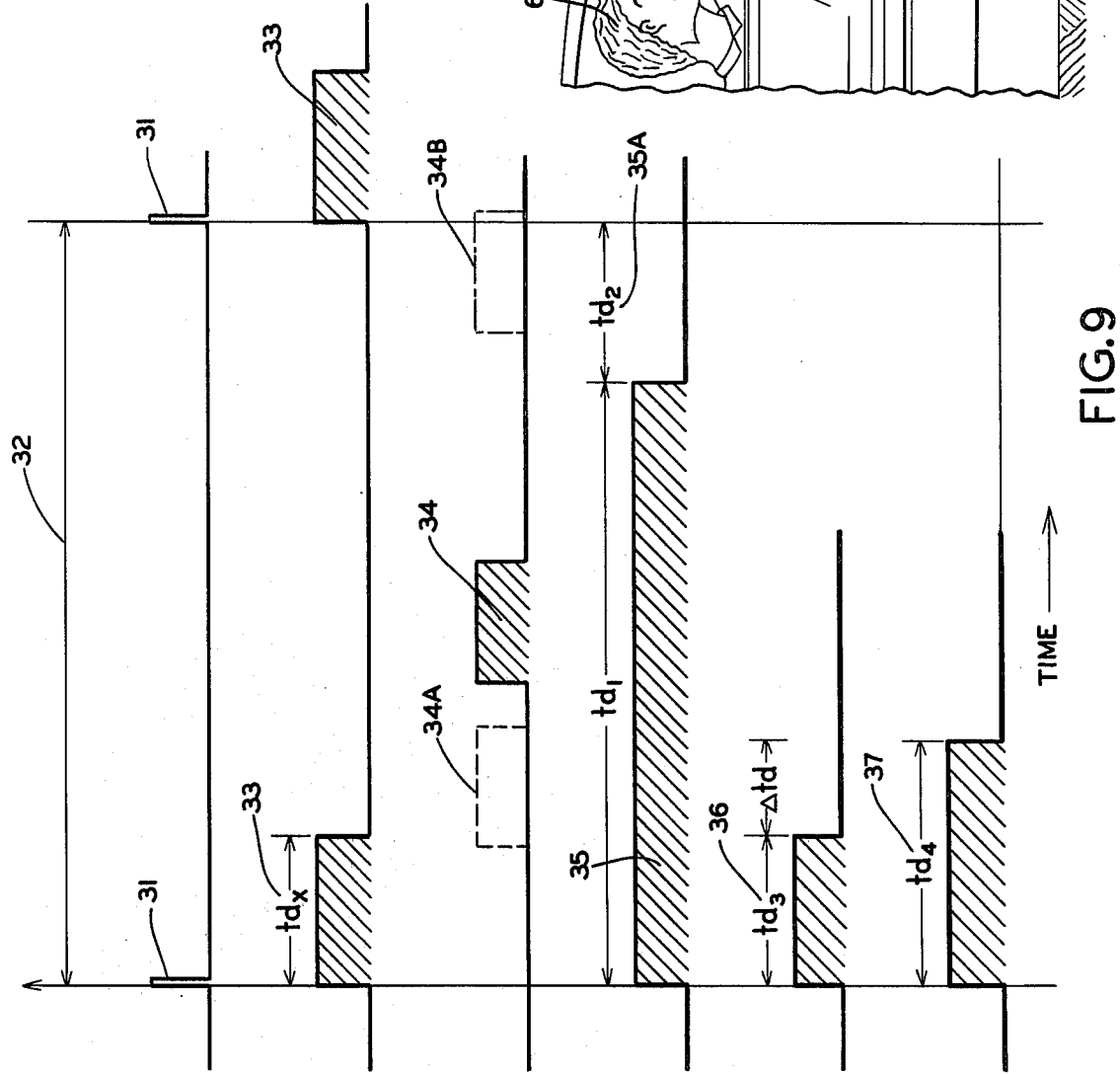
FIG. 9 is a timing diagram of the sonar detector system.

The timing diagram of FIG. 9 illustrates the relationships between the various time signals representing the various distances $d$, $d_1$, $d_2$, $d_3$, $d_4$ and $dx$, and the pulses applied to the transmitter 9 and to the reference timers 22, 22A, 22B, 22-1 and 22C.

The timer pulse 31 is the pulse applied initially from timer 11 to the reference timers 22, 22A, 22B, 22-1 and 22C and to the transmitter 9. The timer period between successive pulses 31 is indicated at 32. The timer period for the 4 inch distance $dx$ is indicated at 33. The digital pulse representation of the received or detected propagation time, as it is applied to the Coincidence Circuitry 20 before coincidence occurs, is shown at 34.

The time period that represents the time $tdl$, which is associated with the 28 inch distance $d_1$ and which represents the distance at which an object 3 is sensed, is indicated at 35. Also, 35A indicates time related to the distance $d_2$ at which an object is no longer sensed. The reference time representing the distance $d_3$ is shown at 36; and the reference time which represents the distance $d_4$ is indicated at 37.

The dotted pulse 34A next to pulse 34 indicates the detected propagation time when coincidence occurs with the fixed propagation time indicated at 33 immediately above in FIG. 9 (the system of FIG. 5), and when drawer movement is stopped by drawer head arrival at the 4 inch distance $dx$.

Comparing the location of the digital pulse 34A vertically with respect to the digital pulses 36 and 37 pictures the control described in connection with FIG. 6 for maintaining the 4 inch distance $dx$ between the drawer head 6 and the object 3, if the object moves with reference to the drawer head.

Coincidence between the pulse 34 and the pulse 35 in FIG. 9 (one above the other vertically) represents the system of FIG. 7 which starts the deal drawer motor drive upon arrival of a vehicle or object 3 at a banking station.

The pulse shown in dot-dash lines at 34B indicates a detected propagation time of an object not sensed in the time period represented at 35A. That is to say 35A represents a distance $d_2$ at which an object is no longer sensed, as described in connection with the system shown in FIG. 8.

IN GENERAL

Although piezoelectric crystals have been described as constituting a transmitter 9 and a receiver 10, one crystal can serve as both transmitter and receiver. Further, the choice of crystals to provide an ultrasonic transducer or sound source includes any that have a natural frequency in the ultrasonic band. That is, the ultrasonic transducer is not necessarily limited to a piezoelectric element that has the specific natural frequency of 23 KHZ per second, referred to the example given.

In the operation of the various systems of FIGS. 5, 6, 7 and 8, the signals from the receiver 10 are passed through the Amplifier and Bandpass Filter 16 where they are amplified until the signal of proper magnitude is provided to be fed to the Threshold Detector and Digital Shaper 18 where it can be converted from an AC to a DC level for digital comparison. This digital comparison takes place in the Coincidence Circuitry 20.

The pulses that are fed from the circuitry 20 to any of the Digital Filters and Accumulators, such as accumulator 24, accumulate so as to screen out stray noise in the area and prevent stray noise from interfering with the operation of the system.

When a predetermined number of pulses that are counted, have accumulated, a resultant signal is given to one of the system control circuitries, such as those indicated at 26 or 28, which in turn signals that the deal drawer drive motor should be energized or deenergized and signals the direction of motor drive. Thus, any one of the Digital Filters and Accumulators checks the integrity of the signals received from Coincidence Circuitry 20.

FIG. 10 is a logic diagram of circuitry of the block 38 (FIG. 5) containing the digital filters and accumulators 24 and 27 and the system start and stop circuitry 26 and 28 forming part of the system 8 of FIG. 5 and to which circuitry 38 pulses from coincidence circuitry are applied.

In the diagram, digital integrated circuits 39 and 40 each may be an RCA CD 4029A COS/MOS presettable Up/Down counter. Inverting type Buffer/Converters are indicated at 41, 42, 43 and 44, which may be RCA CD 4049A digital integrated circuits. Digital integrated circuit elements 45, 46, 47, 48 and 49 may be RCA CD4011A Quad 2-input NAND gates. Delay Timer 50 may be a Signetics NE 555 integrated circuit. Resistors 51 and 52 are equal value resistors having values such as 33000 ohms. Resistor 53 is selected to have a value, say 10000 ohms required to signal motor drive control circuit 4. Transistor 54 may be No. 2N3904.

In the embodiment of FIG. 5, when the system 8 is energized, the circuitry 38 of FIG. 10 also is energized at point 55. Pulses from the Coincidence Circuitry at 59 or 60 are applied, respectively, to Counter/Accumulators 39 or 40. Counter 39 accumulates pulse information when the distance from the head 6 to the object 3 is equal to or less than 4 inches.

Counter 40 accumulates pulses when the distance from the head 6 to the object 3 is greater than 4 inches.

If a total of four consecutive counts are accumulated in counter 39 without fifteen counts being accumulated in counter 40, the output of counter 39 is applied to delay timer 50 and to gate latch combination 46–47 through inverter 41, NAND gate 45 and inverter 42. This stops the motor drive as applied through NAND gate 58, resistors 51 and 53 and transistor 54 to provide a stop signal at 58 to motor drive control circuit 4 after delay timer 50 times out. The input of counter 39 also resets the count of counter 40 at 56.

If counter 40 totals fifteen consecutive counts accumulated without four counts being accumulated in counter 39, a reset of counter 39 is generated as applied through NAND gate 49, at 57. At the same time, a reset is applied to gate latch combination 46–47. The output of NAND gate 47 is applied through NAND gate 48 at 58 to the motor drive control circuit 4, which commands the motor to drive the head forward as the distance is now greater than 4 inches, so that the head 6 moves toward the object 3 until the predetermined 4 inch spacing between the head 6 and object 3 has been reached.

In describing the various systems of FIGS. 5, 6, 7 and 8, and their components and operation, it is indicated that the systems of FIGS. 6, 7 and 8, one or more or all, may supplement the system of FIG. 5, and that certain components in the systems are the same and function or operate in the same manner.

In combining the various supplementary systems with that of FIG. 5, the timer 11, the transmitter 9, the receiver 10, the amplifier 16, the detector and shaper or converter 18, and the coincidence circuitry 20 are one and the same components. In supplementing the system 8 of FIG. 5 with the systems 8A, 8B and 8C, the additional limit timing circuits 22A, 22B, 22-1 and 22C are added to the timing circuit 22; and the signals all are fed to the Coincidence Circuitry 20. Similarly, the additional accumulators and subsequent circuitry (29,30), (24-1,26-1) and (27-1,28-1) are branches from the Coincidence Circuitry 20, along with accumulators and circuitry (24,26) and (27,28) of FIG. 5.

Thus, the sonar positioning and control systems of the invention provide controls for the movement of a deal drawer relative to an object located in the path of travel of a movable deal drawer, as to distance of movement, direction of movement, and space maintained between the deal drawer and an object in the path of travel of a motor driven deal drawer for banking service equipment.

In addition, the sonar systems provide for energizing the deal drawer drive to project the deal drawer to a service position upon arrival of a vehicle at the banking station included in a unit 1 containing the deal drawer to be projected; as well as energizing retraction of the deal drawer when the vehicle that has been serviced departs completely from the banking station.

Accordingly, the concepts of the invention provide systems, equipment and operations by which a deal drawer or other movable component of banking service equipment or a protective transport drawer for any valuable thing may be moved and positioned, and its movement controlled, to locate a deal or transport drawer at a position accessible to but spaced from a vehicle upon vehicle arrival at a delivery station or a banking service station for access to the deal drawer, without collision of the deal drawer with the vehicle, and also controlled to maintain the spaced relation of the deal drawer at said accessible position in event that the vehicle or a door or other part thereof moves in the line of deal drawer travel toward or away from the positioned deal drawer, and also controlled to return the deal drawer to closed position upon complete departure of the vehicle from the service station; and provide systems, equipment and operations achieving the objectives stated, eliminating difficulties in banking service deal drawer operation and control that have existed in prior equipment, and solving problems and obtaining the new results described.

Figure 11:
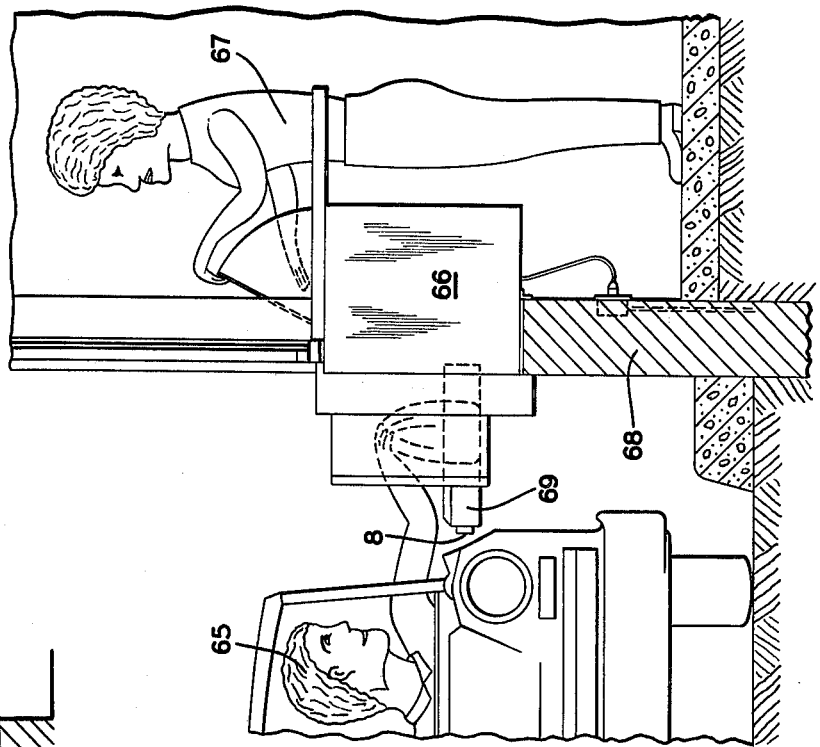
FIG. 11 is a view similar to FIG. 3 of another deal-type transport drawer controlled by the sonar detection system of the invention.

Another deal-type transport drawer is shown in FIG. 11 which may be used for protective delivery or sale, including collection of payment for the sale, of any valuable thing, article or material.

For example, at certain periods of the day or night, drugstores, or fast food outlets, may be vulnerable to attack or hold-up unless protective measures are taken. This may be accomplished by providing the drugstore or fast food outlet with a transport device or package carrier which extends through the wall of the drugstore or fast food building. The device may be the same general type of transport device, package carrier or deal drawer as frequently is used for walk-up or drive-up windows for banking services.

Such transport devices, accompanied by two-way loudspeaker or audible communication, enable a prescription to be conveyed by the transport device from a customer to a druggist, the prescription made up or renewed, and payment therefor obtained, by extending and retracting the transport device. Then the pharmaceutical is delivered by the transport device to the customer who has remained in his or her vehicle.

Such a customer is indicated in FIG. 11 at 65, the transport device at 66, and the druggist at 67. The transport device 66 extends protectively through the building wall 68 and its drawer 69 is extended and retracted in transporting things between the customer 65 and the druggist 67. The improved sonar detector device of the various embodiments of the invention described in connection with FIGS. 1 to 10 is indicated generally at 8 in FIG. 11. The sonar detector system or device 8 may be constructed and operated to control the transport device 66 in the same manner as described above in connection with FIGS. 1 through 10.

The transport device 66, as stated, may be used in protectively transporting, and selling drugs or pharmaceuticals; and also may be used for the sale of fast foods such as hamburgers, milkshakes, and other food products under conditions which protect personnel at a fast food establishment from robbery while permitting transport to a customer in a vehicle, of the article or thing being purchased.

Any valuable thing, package, or article, such as library books, also may be protectively handled in a transport drawer or package carrier, such as diagrammatically indicated in FIG. 11.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the systems and equipment are assembled, combined and operated, and the advantageous, new and useful results obtained; the new and useful structures, devices, elements, arrangements, parts, combinations, systems, equipment, operations and relationships are set forth in the appended claims.

We claim:

1. A sonar actuated control system for positioning and controlling movement of power driven banking service equipment, including movable deal drawer means having a head; housing means for the deal drawer means; motor drive means for the deal drawer means for moving the deal drawer means in either direction between closed and open positions; sonar detector means mounted on deal drawer means head; said detector means including ultrasonic transducer wave transmitter and receiver means on the head tuned to the same frequency; means operative during drawer head movement toward open position for energizing the transmitter means to emit ultrasonic pulses having a predetermined repetition rate from the transmitter means toward an object to be serviced by the deal drawer means at an open position of the deal drawer means; pulses reflected from said object being received by said receiver means; means for detecting the propagation time of a transmitted and a corresponding received pulse; said detected propagation time at any drawer head location indicating the distance between the head and said object at said drawer head location; said detector means also including means for generating a reference propagation time range window synchronized to the transmitted pulses; said reference propagation time range window representing a predetermined maximum and minimum stopping distance between the drawer head and object; means for comparing the detected and reference propagation times; and means for stopping the deal drawer motor drive operative when the detected propagation time corresponds to said reference range window.

2. The system as defined in claim 1 including first accumulating means responsive to said comparing means for accumulating data when the distance between said head and said object is less than said predetermined minimum distance; second accumulating means responsive to said comparing means for accumulating data when the distance between said head and said object is within said predetermined maximum and minimum stopping distances; third accumulating means responsive to said comparing means for accumulating data when the distance between said head and said object is greater than said predetermined maximum distance; means responsive to said first and third accumulating means for energizing said motor drive means to move said head respectively toward a location within said minimum and maximum distances; and means responsive to said second accumulating means for de-energizing said motor drive means.

3. A sonar actuated control system for movable banking service equipment including a power driven deal drawer having a head; motor drive means for the head for moving the head in either direction between closed and open positions; ultrasonic means for detecting the existence of a predetermined fixed distance between the deal drawer head and an object in the path of movement of the head as the deal drawer moves from closed to open position toward said object; and means actuated by said ultrasonic means for stopping said motor drive means upon the detection of said predetermined, fixed distance, wherein the deal drawer, motor drive means and ultrasonic means are components of a banking equipment unit located at a banking service station; in which the object is a vehicle to be served at said station; and in which the ultrasonic means, upon arrival of said vehicle at said station, energizes the motor drive means to move the deal drawer from a closed toward an open position spaced from but accessible to the vehicle.

4. The system defined in claim 3 in which the ultrasonic means upon complete departure of the vehicle from the station energizes the motor drive means to move the deal drawer to closed position from the open position where the deal drawer had been stopped to service the vehicle upon the detection of said predetermined fixed distance.

5. The system defined in claim 3 in which the ultrasonic means maintains the predetermined fixed distance between the head and vehicle after the head has been stopped at said predetermined fixed distance in event that the vehicle or a door and the like part thereof moves either toward or away from the stopped head.

6. A sonar actuated control system for movable banking service equipment including a power driven deal drawer having a head; motor drive means for the head for moving the head in either direction between closed and open positions; ultrasonic means mounted on the deal drawer controlling the distance relative to an object in the path of movement of the head that the head is moved by the drive means with respect to said object, to position the drawer head and stop drawer head movement at a predetermined fixed distance from said object; said ultrasonic means including control means maintaining said predetermined fixed distance between the head and object after the head has been positioned at said predetermined fixed distance, in event that the object moves in either direction with respect to the positioned head; in which the object is a vehicle that has moved to a location for access to and in the path of movement of the deal drawer; and in which the ultrasonic means upon arrival of the vehicle at said location energizes the motor drive means to move the deal drawer toward the vehicle.

7. The system defined in claim 6 in which the ultrasonic means upon complete departure of the vehicle from said location energizes the motor drive means to move the deal drawer back to closed position.

8. The system defined in claim 6, including first accumulating means responsive to said control means upon movement of the object after being positioned at said predetermined fixed distance for accumulating data when the distance between said head and said object is less than or equal to said predetermined fixed distance; second accumulating means responsive to said control means upon said last mentioned movement of said object for accumulating data when the distance between said head and said object is greater than said predetermined, fixed distance; means responsive to said second accumulating means for energizing said motor drive means to bring said head toward a location corresponding to said predetermined fixed distance; and means responsive to said first accumulating means for de-energizing said motor drive means.

9. The system defined in claim 6, including accumulating means responsive to said control means for accumulating data when said object moves after being positioned at said predetermined fixed distance and when the distance between said head and said object is greater than a second predetermined distance indicating that the object is not present; and means responsive to said accumulating means for energizing said motor drive means to move said head to a home position.

10. The system defined in claim 6, including accumulating means responsive to said control means for accumulating data when an object moves toward said head and when the distance between said head and said object is within a predetermined first distance indicating that the object is present; and means responsive to said accumulating means to move said head toward a location corresponding to a predetermined second distance between said head and said object.

11. A sonar actuated control system for positioning and controlling movement of power driven protective transport equipment, including movable deal-type transport drawer means having a head; housing means for the transport drawer means; motor drive means for the transport drawer means for moving the transport drawer means in either direction between closed and open positions to convey a valuable thing from the housing to open drawer means position and vice versa, sonar detector means mounted on transport drawer means head; said detector means including ultrasonic transducer wave transmitter and receiver means on the head tuned to the same frequency; means operative during drawer head movement toward open position for energizing the transmitter means to emit ultrasonic pulses having a predetermined repetition rate from the transmitter means toward an object to be serviced by the transport drawer means at an open position of the transport drawer means; pulses reflected from said object being received by said receiver means; means for detecting the propagation time of a transmitted and a corresponding received pulse; said detected propagation time at any drawer head location indicating the distance between the head and said object at said drawer head location; said detector means also including means for generating a reference propagation time range window synchronized to the transmitted pulses; said reference propagation time range window representing a predetermined maximum and minimum stopping distance between the drawer head and object; means for comparing the detected and reference propagation times; and means for stopping the transport drawer motor drive operative when the detected propagation time corresponds to said reference range window.

12. A sonar actuated control system for protective transport service equipment including a power driven deal-type transport drawer having a head; motor drive means for the head for moving the head in either direction between closed and open positions to convey valuable things in the transport drawer between said closed and open positions; ultrasonic means for detecting the existence of a predetermined fixed distance between the drawer head and an object in the path of movement of the head as the transport drawer moves from closed to open position toward said object; and means actuated by said ultrasonic means for stopping said motor drive means upon the detection of said predetermined, fixed distance, wherein the transport drawer, motor drive means and ultrasonic means are components of a transport equipment unit located at a service station for valuable things; in which the object is a vehicle to be served at said station; and in which the ultrasonic means, upon arrival of said vehicle at said station, energizes the motor drive means to move the transport drawer from a closed toward an open position spaced from but accessible to the vehicle for delivery or receiving a valuable thing.

13. A sonar actuated control system for protective transport service equipment including a power driven deal-type transport drawer having a head; motor drive means for the head for moving the head in either direction between closed and open positions to convey valuable things in the transport drawer between said closed and open positions; ultrasonic means mounted on the transport drawer controlling the distance relative to an object in the path of movement of the head that the head is moved by the drive means with respect to said object, to position the drawer head and stop drawer head movement at a predetermined fixed distance from said object; said ultrasonic means including control means maintaining said predetermined fixed distance between the head and object after the head has been positioned at said predetermined fixed distance, in event that the object moves in either direction with respect to the positioned head; in which the object is a vehicle that has moved to a location for access to and in the path of movement of the drawer head; and in which the ultrasonic means upon arrival of the vehicle at said location energizes the motor drive means to move the transport drawer toward the vehicle.

* * * * *